(12) United States Patent
Thor et al.

(10) Patent No.: US 9,247,164 B1
(45) Date of Patent: Jan. 26, 2016

(54) IMAGE PIXEL MORE ROBUST TO POWER SUPPLY NOISE, DARK NODE FOR USE IN THE IMAGE PIXEL, AND CONTROL METHOD THEREOF

(71) Applicants: Swee-Lin Thor, Penang (MY); Wooi-Kip Lim, Penang (MY)

(72) Inventors: Swee-Lin Thor, Penang (MY); Wooi-Kip Lim, Penang (MY)

(73) Assignee: PIXART IMAGING (PENANG) SDN. BHD., Penang (MY)

( * ) Notice: Subject to any disclaimer, the term of this patent is extended or adjusted under 35 U.S.C. 154(b) by 0 days.

(21) Appl. No.: 14/519,334

(22) Filed: Oct. 21, 2014

(51) Int. Cl.
*H04N 5/361* (2011.01)
*H04N 5/351* (2011.01)
*H04N 5/217* (2011.01)
*H04N 5/357* (2011.01)

(52) U.S. Cl.
CPC ............... *H04N 5/361* (2013.01); *H04N 5/351* (2013.01)

(58) Field of Classification Search
CPC ..... H04N 5/361; H04N 5/351; H04N 5/2176; H04N 5/3575
USPC ......................... 348/243, 241, 308; 250/208.1
See application file for complete search history.

(56) References Cited

U.S. PATENT DOCUMENTS

| | | | | | |
|---|---|---|---|---|---|
| 5,633,679 | A * | 5/1997 | Hosier | ................... | H04N 5/361 348/243 |
| 6,130,712 | A * | 10/2000 | Miyazaki | ............... | H04N 5/361 348/243 |
| 9,106,853 | B2 * | 8/2015 | Kanemitsu | ............. | H04N 5/361 348/243 |
| 2009/0244338 | A1* | 10/2009 | Kume | .................. | H04N 5/3575 348/294 |
| 2011/0050969 | A1* | 3/2011 | Nishihara | ............... | H04N 5/357 348/308 |
| 2013/0181112 | A1* | 7/2013 | Richardson | ............ | H04N 5/361 250/208.1 |
| 2013/0206959 | A1* | 8/2013 | Zhang | .................. | H04N 5/2176 250/208.1 |
| 2014/0027611 | A1* | 1/2014 | Patel | ...................... | H04N 5/361 250/208.1 |

* cited by examiner

*Primary Examiner* — Nhan T Tran
(74) *Attorney, Agent, or Firm* — Tung & Associates

(57) ABSTRACT

An image pixel includes light nodes and a dark node. The dark node includes: a first charge storage unit for storing first power supply information during a first time period; a second charge storage unit for storing second power supply information related to the power supply during a second time period; and an information output unit for outputting a first sample signal related to the first power supply information or a second sample signal related to the second power supply information. The first power supply information remains in the first charge storage unit during the second time period and during when the second sample signal is outputted by the information output unit.

12 Claims, 11 Drawing Sheets

IMAGE PIXEL MORE ROBUST TO POWER SUPPLY NOISE, DARK NODE FOR USE IN THE IMAGE PIXEL, AND CONTROL METHOD THEREOF

BACKGROUND OF THE INVENTION

1. Field of Invention

The present invention relates to an image pixel, a dark node for use in the image pixel, and a control method for controlling the image pixel; particularly, it relates to such image pixel which is not sensitive to power supply noise because the dark node therein is capable of retaining power supply information.

2. Description of Related Art

Please refer to FIG. 1, which shows a schematic diagram of a conventional image pixel. The conventional image pixel 10 comprises plural light nodes (LN) 101 and plural dark nodes (DN) 102 arranged in a form of, for example, a 30 µm×30 µm array, wherein the dark nodes 102 are arranged at one peripheral side in order to increase the fill factor of the array. A dark node 102 is shared by the light nodes 101 of the same column.

Typically, the conventional image pixel 10 operates by three phases, which are: a reset phase, a shutter phase and a readout phase. The reset phase resets the charges stored in the nodes. The shutter phase exposes the pixel. The readout phase takes two samples, Sample 1 and Sample 2. Sample 1 is for sampling the light signal, which can be represented as: $(DN-LN)_{Sample1}$, that is, the data obtained by the dark node minus the data obtained by the light node; and Sample 2 is for sampling the reset signal, which can be represented as: $(DN-LN)_{Sample2}$. The signal of the conventional image pixel 10 is obtained by subtracting the reset signal from the light signal, and can be represented as:

the signal of image pixel $10 = (DN-LN)_{Sample1} - (DN-LN)_{Sample2}$. The readout phase is performed sequentially for every light node, that is, after one light node and a corresponding dark node are read out [i.e., two samples (Sample 1 and Sample 2) are taken from them], a next light node and a dark node corresponding to this light next node are read out.

Please refer to FIGS. 2A and 2B. FIG. 2A shows a schematic diagram of a conventional light node during a reset phase. FIG. 2B shows a schematic diagram of a conventional dark node during the reset phase. During the reset phase, a capacitor C0 of the light node 101 and a capacitor C1 of the dark node 102 are reset (connected to the power supply by the switches LS2 and DS2, whereas the switches LS1, LS3, LS4, DS1, DS3 and DS4 are opened), so that the power supply information V1 is stored in the capacitor C1 (FIG. 2B), and the voltage V0 of the capacitor C0 (FIG. 2A) is the same as V1. That is, in the reset phase, the voltage V1 of the capacitor C1 is reset to be corresponding to the power supply and the voltage V0 of the capacitor C0 is reset to V1.

Please refer to FIGS. 3A and 3B. FIG. 3A shows a schematic diagram of a conventional light node during a shutter phase. FIG. 3B shows a schematic diagram of a conventional dark node during the shutter phase. During the shutter phase, the switches LS2 and DS2 are opened; the switch LS3 is closed, while the switch DS3 remains opened. The other switches remain opened. The capacitor C0 of the light node 101 performs integration in response to light, so as to produce an integration voltage Vint (as shown in FIG. 3A); in the meanwhile, the power supply information V1 stored in the capacitor C1 of the dark node 102 remains the same. The integration voltage Vint is not equal to the power supply information V1, and the difference is related to the exposure.

Please refer to FIGS. 4A and 4B. FIG. 4A shows a schematic diagram of a conventional light node during a first sample stage (Sample 1) of a readout phase. FIG. 4B shows a schematic diagram of a conventional dark node during the first sample stage of the readout phase. As described above, Sample 1 is for sampling the light signal, which can be represented as: $(DN-LN)_{Sample1}$. According to FIGS. 3A-3B, the voltage of the capacitor C0 of the light node 101 is "Vint", and the power supply information stored in the capacitor C1 of the dark node 102 is "V1". Hence, during Sample 1, a differential signal between the power supply information Vint and V1 can be obtained by closing the switches LS4 and DS4, and an analog-to-digital converter (ADC, not shown) receives these two signals through source follower effects provided by transistors LM1 and DM1, where the input of ADC is equal to (V1-Vint) multiplied by the gain of source followers, assuming that the gain of the two source followers LM1 and DM1 are the same.

Please refer to FIGS. 5A and 5B. FIG. 5A shows a schematic diagram of a conventional light node during a second sample stage (Sample 2) of a readout phase. FIG. 5B shows a schematic diagram of a conventional dark node during the second sample stage of the readout phase. As described above, Sample 2 is for sampling the reset signal, which can be represented as: $(DN-LN)_{Sample2}$. According to FIGS. 5A-5B, the switches LS2 and DS2 are again closed to reset the capacitor C0 and the capacitor C1. Ideally, in the Sample 2, the voltages of the capacitors C0 and C1 should be reset to the same voltages as the power supply information V1. However, practically, the voltages of the capacitors C0 and C1 will be reset to a voltage different from V1, as shown by "V2" in FIGS. 5A and 5B. One of the reasons for this variation is the power supply noise. As a consequence, during Sample 1 of a next light node, the input of ADC is equal to (V2-Vint) multiplied by the gain of source followers, not (V1-Vint) multiplied by the gain of source followers. The result calculated by $(DN-LN)_{Sample1} - (DN-LN)_{Sample2}$ therefore varies from one light node to another light node because the voltages of the capacitors C0 and C1 are not always reset to the same power supply voltage. In a worst case, an error in the digital output generated by the ADC may be as high as 5 LSB.

To sum up, in the conventional image pixel 10, because the dark nodes 102 are one row of nodes each of which is shared by a column of light nodes 101 (as shown in FIG. 1), after the first row of light nodes are readout, all the dark nodes 102 will be reset, thereby causing the power supply information to be lost. Hence, the conventional image pixel 10 is very sensitive to power supply noise.

In view of the above, to overcome the drawback in the prior art, the present invention proposes an image pixel which is not sensitive to power supply noise and a dark node for use in the image pixel.

SUMMARY OF THE INVENTION

From one perspective, the present invention provides an image pixel, comprising: a plurality of light nodes which are arranged in an array and receive power from a power supply; and at least one dark node, wherein the dark node includes: a first charge storage unit coupled to the power supply for storing first power supply information related to the power supply during a first time period; a second charge storage unit coupled to the power supply for storing second power supply information related to the power supply during a second time period; and an information output unit coupled to both the first and second charge storage units for outputting a first sample signal related to the first power supply information or a second sample signal related to the second power supply information; wherein the first power supply information remains in the first charge storage unit during the second time period and during when the second sample signal is outputted by the information output unit.

In one embodiment, the image pixel operates by three phases including: a reset phase which includes the first time period, in which the light nodes are reset to store the first power supply information and the first charge storage unit also stores the first power supply information; a shutter phase, in which the light nodes are exposed to light to produce integrated voltages in response to the light; and a readout phase which is performed sequentially for every light node, the readout phase including a first sample stage and a second sample stage, wherein in the first sample stage, the first power supply information is outputted from the first charge storage unit and the integrated voltage corresponding to a selected one of the light nodes is outputted, and wherein in the second sample stage which includes the second time period, the selected one of the light nodes is reset to store the second power supply information and the second charge storage unit also stores the second power supply information.

In one embodiment, in the second sample stage, the selected one of the light nodes outputs the second power supply information and the second charge storage unit also outputs the second power supply information.

In one embodiment, in the first sample stage, a differential signal is formed which is related to [(the first power supply information) minus (the integrated voltage corresponding to the selected one of the light nodes)], or V1-Vint, wherein V1 is the first power supply information and Vint is the integrated voltage corresponding to the selected one of the light nodes.

In one embodiment, the image pixel includes only one dark node.

In one embodiment, the first charge storage unit includes: a first current conduction device, a first switch, and a first capacitor connected in series between the power supply and a reference voltage level, wherein when the first switch is closed, the first power supply information is stored in the first capacitor; and a first transistor and a second switch connected in series between the power supply and an output common node, the first transistor having a control end coupled to a higher voltage end of the first capacitor, wherein when the second switch is closed, the information stored in the first capacitor is outputted through the output common node; and the second charge storage unit includes: a second current conduction device, a third switch, and a second capacitor connected in series between the power supply and the reference voltage level, wherein when the third switch is closed, the second power supply information is stored in the second capacitor; and a second transistor and a fourth switch connected in series between the power supply and the output common node, the second transistor having a control end coupled to a higher voltage end of the second capacitor, wherein when the fourth switch is closed, the information stored in the second capacitor is outputted through the output common node.

In one embodiment, the first and second current conduction devices are current sources or resistors.

From another perspective, the present invention provides a dark node for use in an image pixel, wherein the dark node includes: a first current conduction device, a first switch, and a first capacitor connected in series between a power supply and a reference voltage level; a first transistor and a second switch connected in series between the power supply and an output common node, the first transistor having a control end coupled to a higher voltage end of the first capacitor; a second current conduction device, a third switch, and a second capacitor connected in series between the power supply and the reference voltage level; a second transistor and a fourth switch connected in series between the power supply and the output common node, the second transistor having a control end coupled to a higher voltage end of the second capacitor; and a third current conduction device coupled to the output common node.

In one embodiment, the first, second and third current conduction devices are current sources or resistors.

From another perspective, the present invention provides a method for controlling an image pixel including a plurality of light nodes and at least one dark node, the method comprising: resetting the light nodes and the dark node to a first voltage level corresponding to a power supply during a first time period, and storing the voltage level by a first storage unit in the dark node; exposing the light nodes to light; reading out a selected one of the light nodes and the first voltage level stored by the first storage unit; and resetting the selected one of the light nodes and the dark node to a second voltage level corresponding to the power supply during a second time period, and storing the second voltage level by a second storage unit in the dark node; wherein the first storage unit keeps the first voltage level when the dark node is reset to a second voltage level.

In one embodiment, the method further comprises: outputting the second voltage level from the selected one of the light nodes and the dark node.

In one embodiment, the method further comprises: repeating the reading out step for every light node, and resetting the readout light node and the dark node to the second voltage level.

DESCRIPTION OF THE PREFERRED EMBODIMENTS

Figure 1:
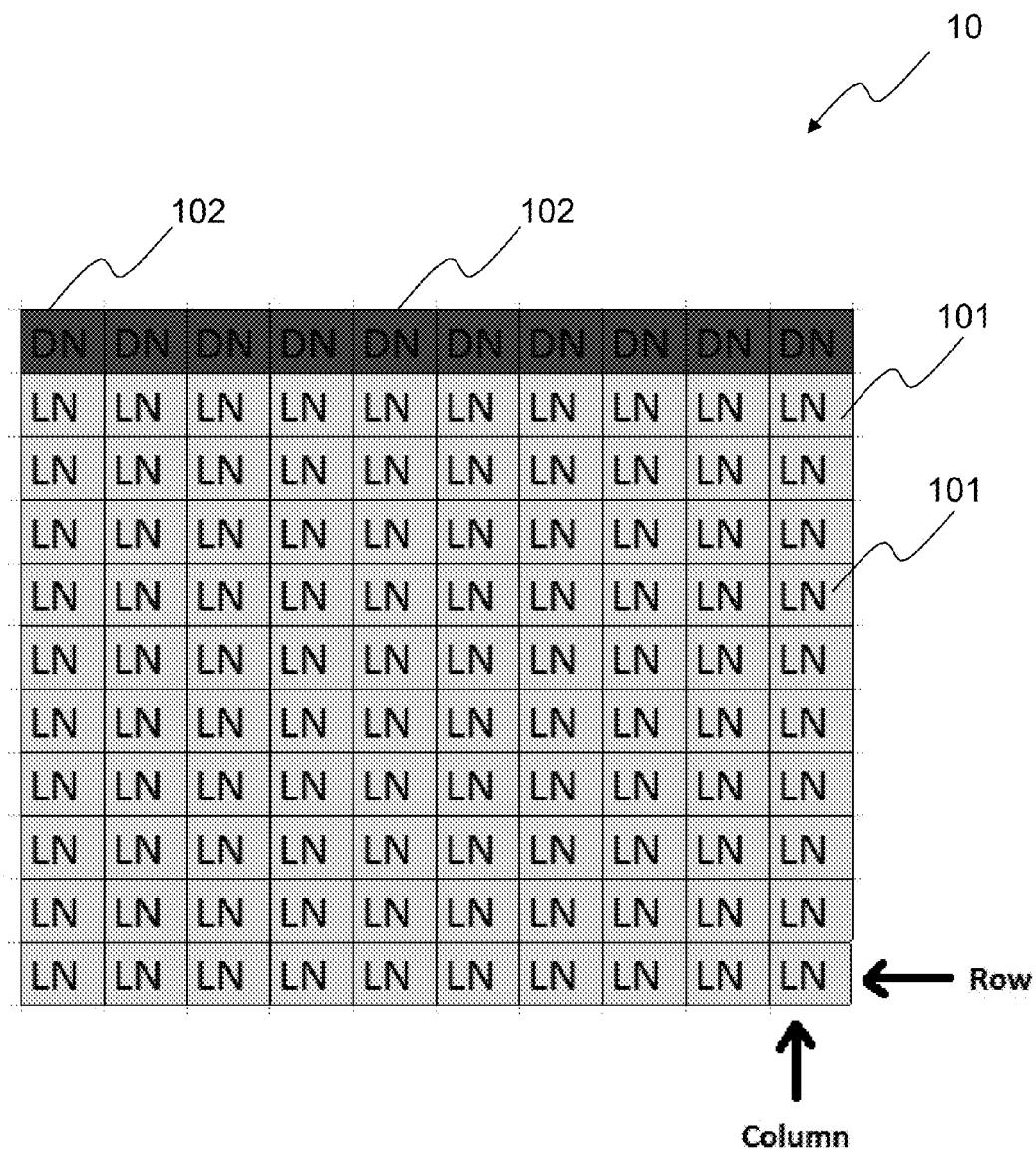
FIG. 1 shows a schematic diagram of a conventional image pixel.
Figure 2A:
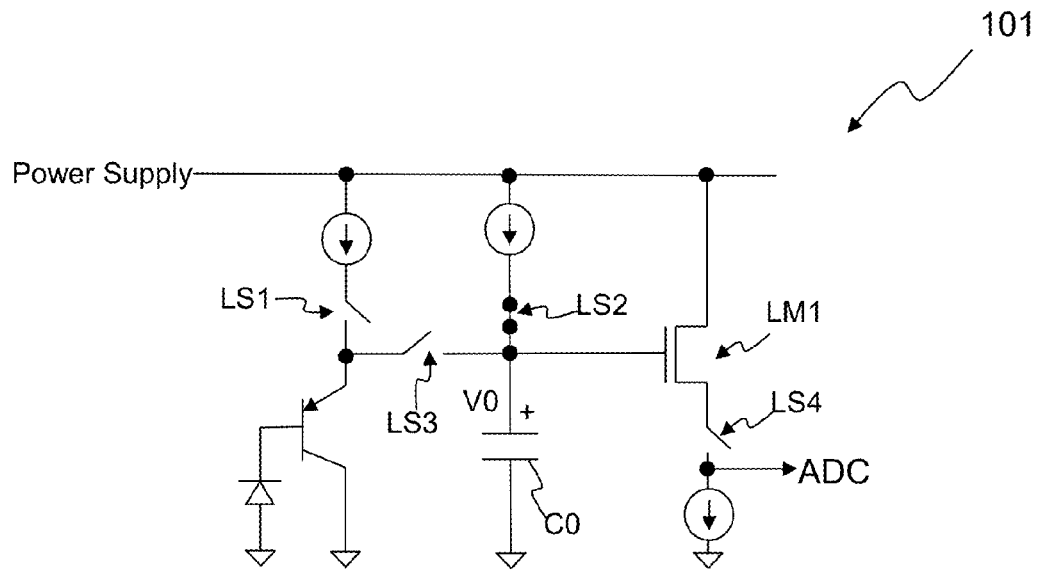
FIG. 2A shows a schematic diagram of a conventional light node during a reset phase.
Figure 2B:
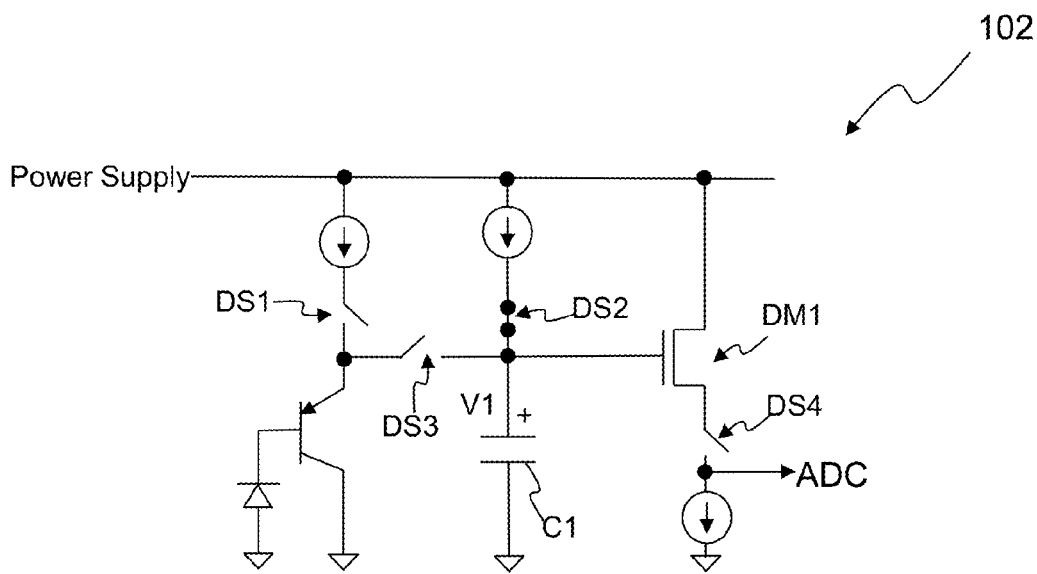
FIG. 2B shows a schematic diagram of a conventional dark node during a reset phase.
Figure 3A:
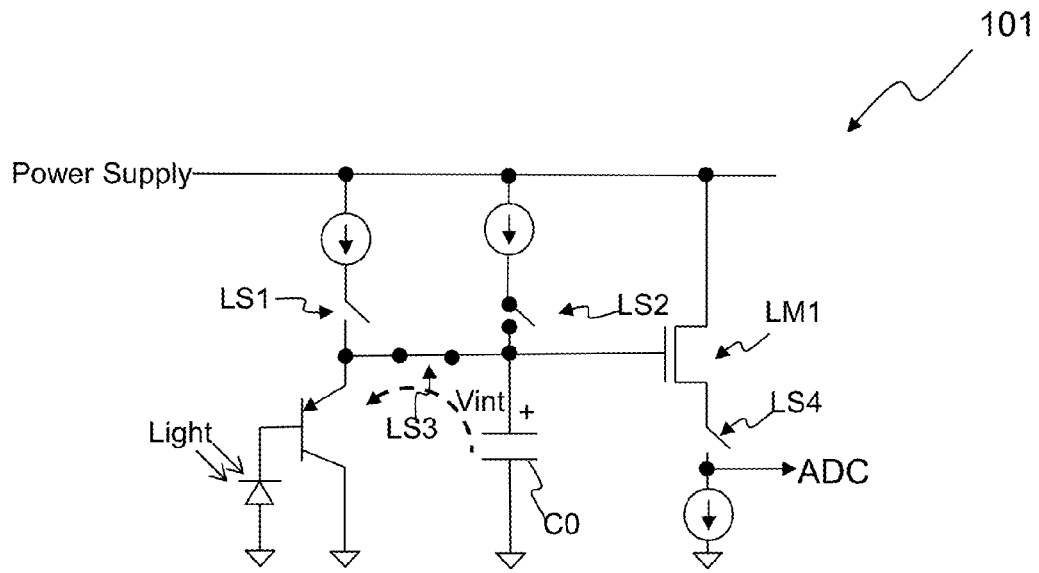
FIG. 3A shows a schematic diagram of a conventional light node during a shutter phase.
Figure 3B:
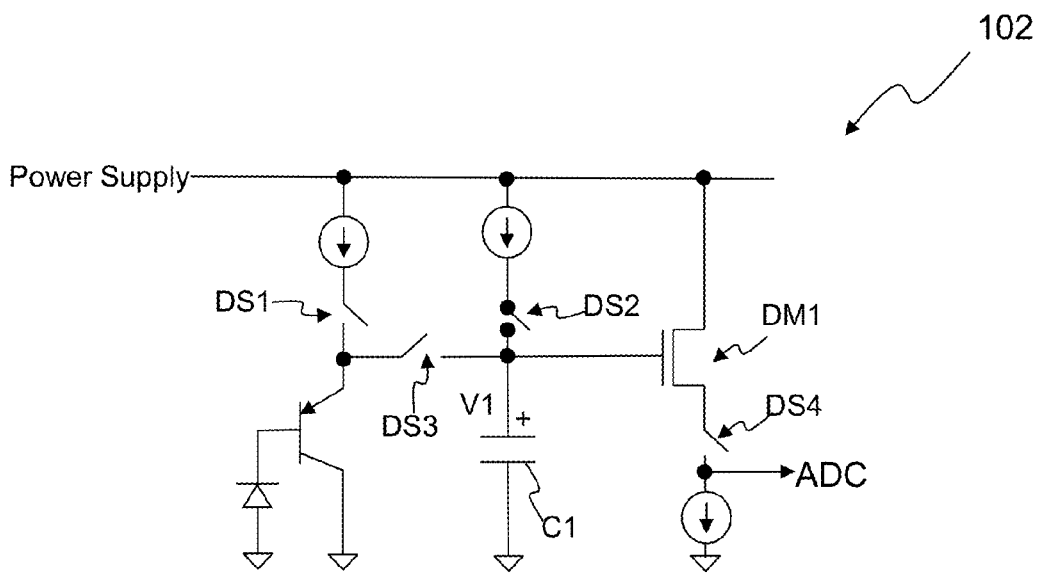
FIG. 3B shows a schematic diagram of a conventional dark node during a shutter phase.
Figure 4A:
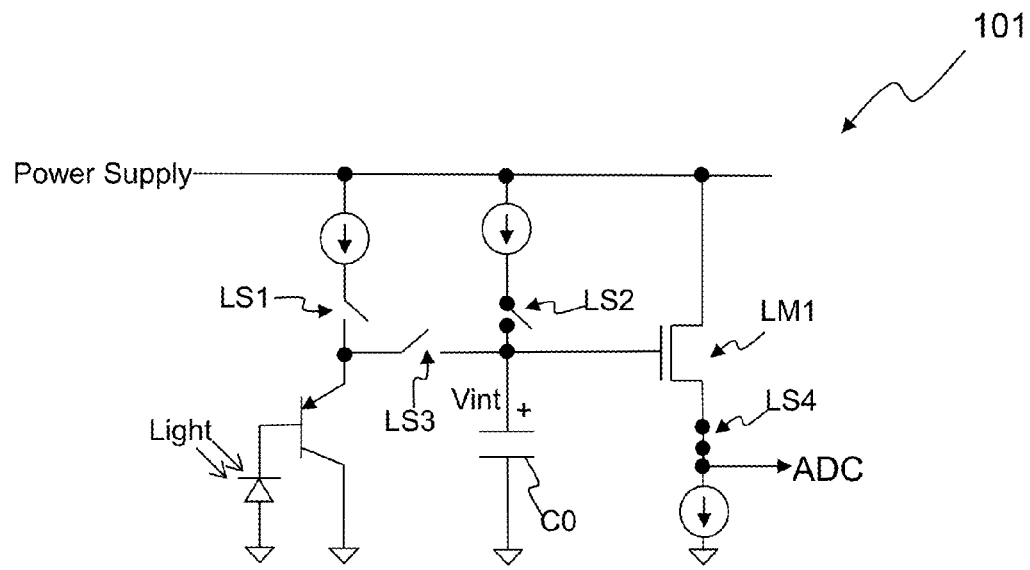
FIG. 4A shows a schematic diagram of a conventional light node during a first sample stage of a readout phase.
Figure 4B:
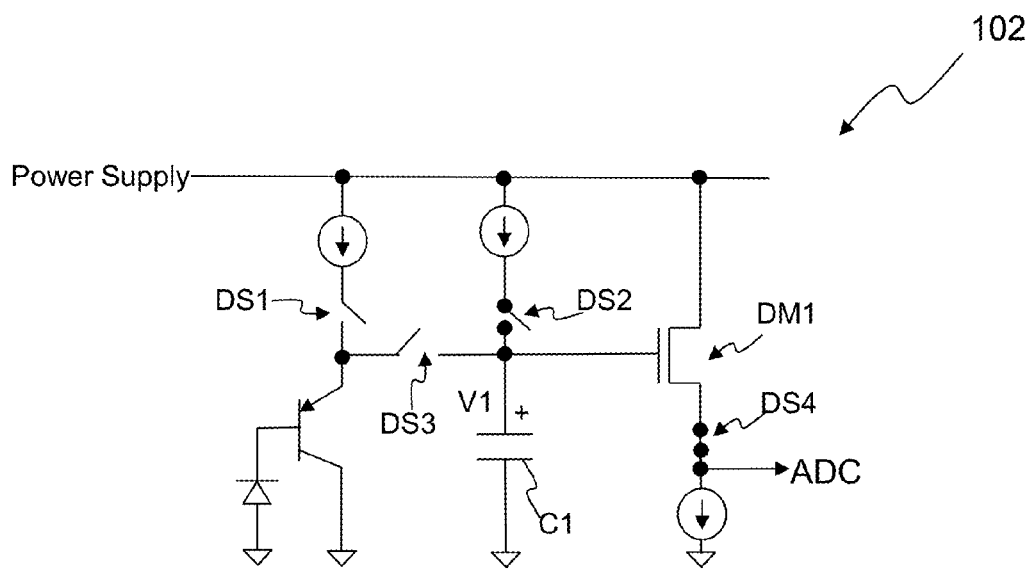
FIG. 4B shows a schematic diagram of a conventional dark node during a first sample stage of a readout phase.
Figure 5A:
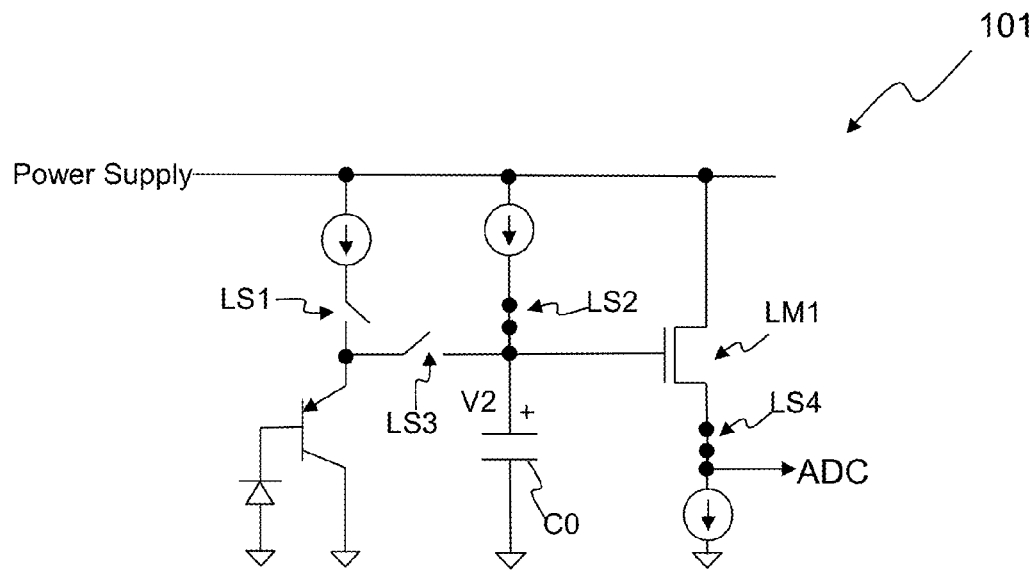
FIG. 5A shows a schematic diagram of a conventional light node during a second sample stage of a readout phase.
Figure 5B:
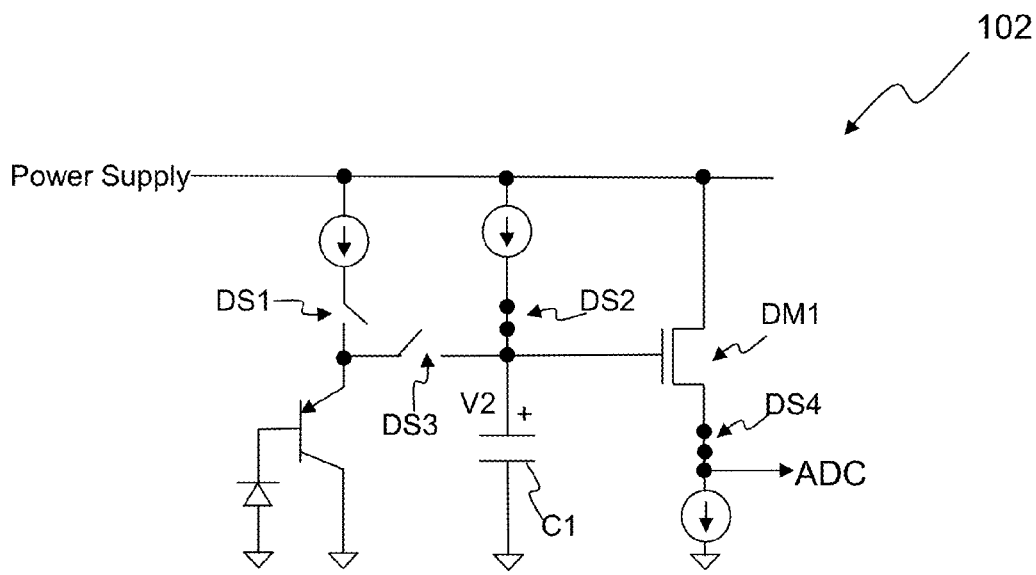
FIG. 5B shows a schematic diagram of a conventional dark node during a second sample stage of a readout phase.

The above and other technical details, features and effects of the present invention will be will be better understood with regard to the detailed description of the embodiments below, with reference to the drawings. In the description, the words relate to directions such as "on", "below", "left", "right", "forward", "backward", etc. are used to illustrate relative orientations in the drawings and should not be considered as limiting in any way. The drawings as referred to throughout the description of the present invention are for illustration only, to show the interrelations between the components/devices, but not drawn according to actual scale.

Figure 6:
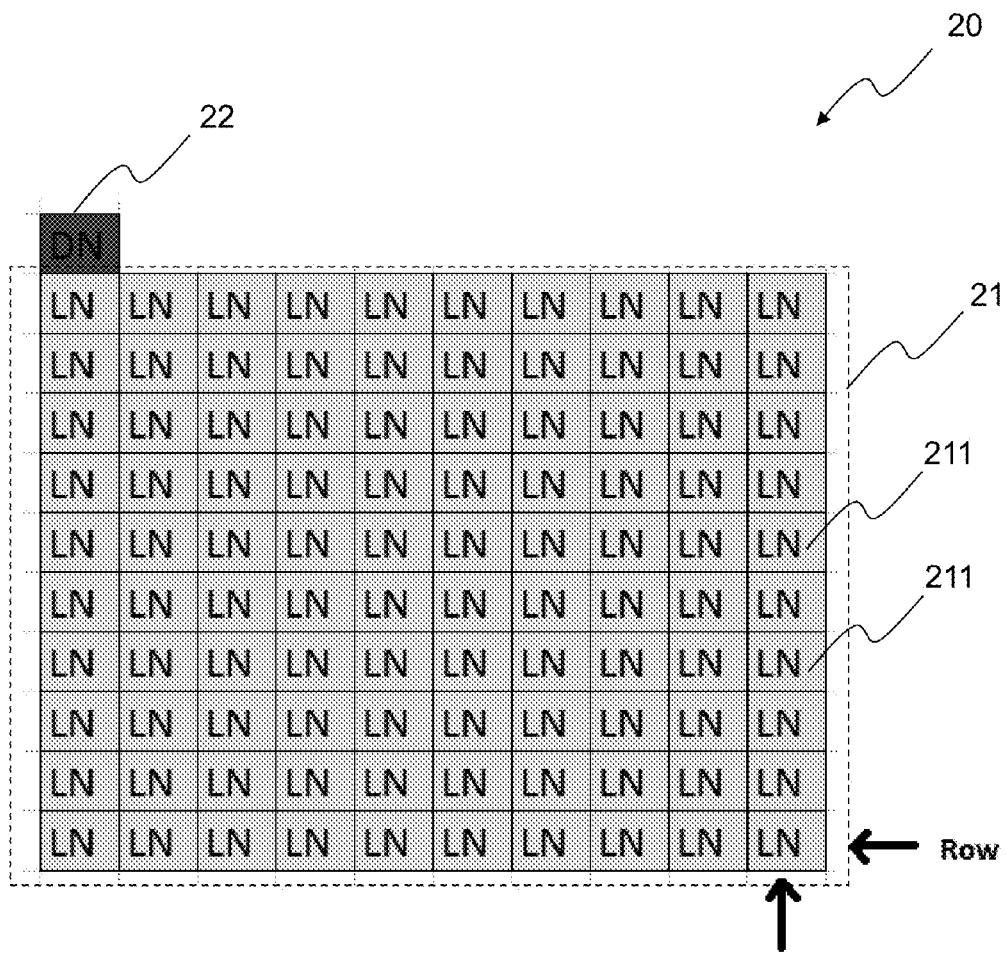
FIG. 6 shows a schematic diagram of an image pixel according to an embodiment of the present invention.

Please refer to FIG. 6, which shows a schematic diagram of an image pixel according to an embodiment of the present invention. The present invention proposes an improvement of the structure of the dark node, so that the image pixel 20 only requires a less number of dark nodes as compared with the prior art, but is more robust (less sensitive) to power supply noise. In the embodiment shown in FIG. 6, the image pixel 20 comprises plural light nodes 211 arranged in an array 21 of columns and rows, and in a preferred embodiment, the image pixel 20 comprises only one single dark node 22, rather than a row of dark nodes 102 as shown in FIG. 1. "One" single dark node is preferred, but the image pixel 20 can include any number of dark nodes. As shown in FIG. 6, "DN" indicates a dark node 22 and "LN" indicates a light node 211.

Figure 7:
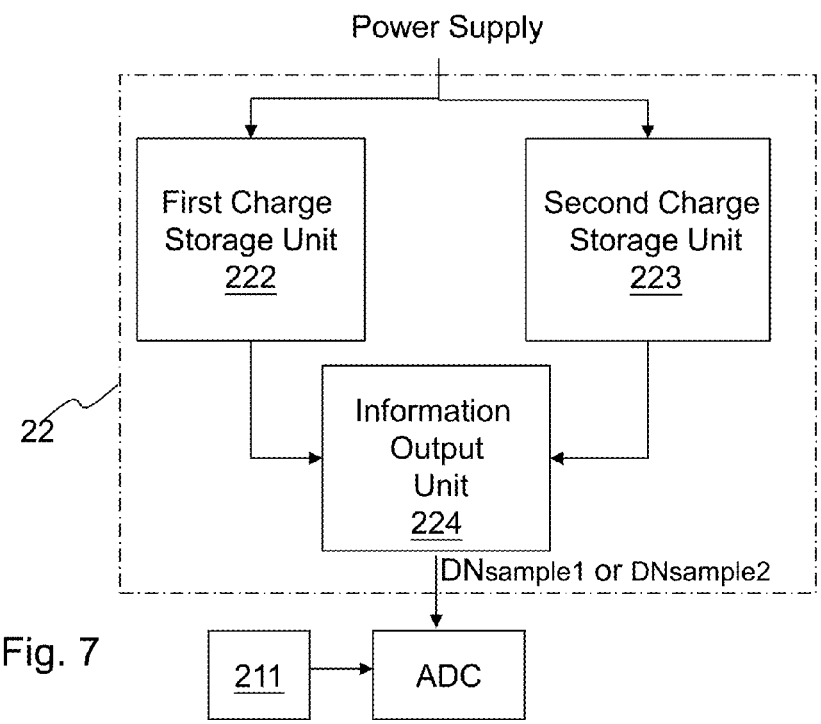
FIG. 7 shows a block diagram of a dark node according to an embodiment of the present invention.

The image pixel 20 operates by three phases, including a reset phase, a shutter phase and a readout phase. The readout phase includes two sample stages, including a first sample stage (Sample 1) and a second sample stage (Sample 2). The first sample stage generates a first sample signal $DN_{Sample1}$, and the second sample stage generates a second sample signal $DN_{Sample2}$ (as shown in FIG. 7). An ADC receives the output signals from the dark node 22 and a selected one of the light node 211 to produce the differential signal $(DN-LN)_{Sample1}$ in the first sample stage, and the differential signal $(DN-LN)_{Sample2}$ in the second sample stage. The image signal of the image pixel 20 is obtained by subtracting the differential signal $(DN-LN)_{Sample2}$ from the differential signal $(DN-LN)_{Sample}$, and can be represented as:

the signal of image pixel 20=$(DN-LN)_{Sample1}-(DN-LN)_{Sample2}$.

FIG. 7 shows a block diagram of a dark node according to an embodiment of the present invention. As shown in FIG. 7, the dark node 22 includes a first charge storage unit 222, a second charge storage unit 223 and an information output unit 224. The first charge storage unit 222 stores information of the power supply during the reset phase (referred to as the first power supply information V1 hereinafter). The second charge storage unit 223 stores information of the power supply during the second sample stage of the readout phase (referred to as the second power supply information V2 hereinafter). The information output unit 224 outputs the first sample signal $DN_{sample1}$ or the second sample signal $DN_{Sample2}$ depending on whether the dark node 22 is performing the first sample or the second sample.

Figure 8:
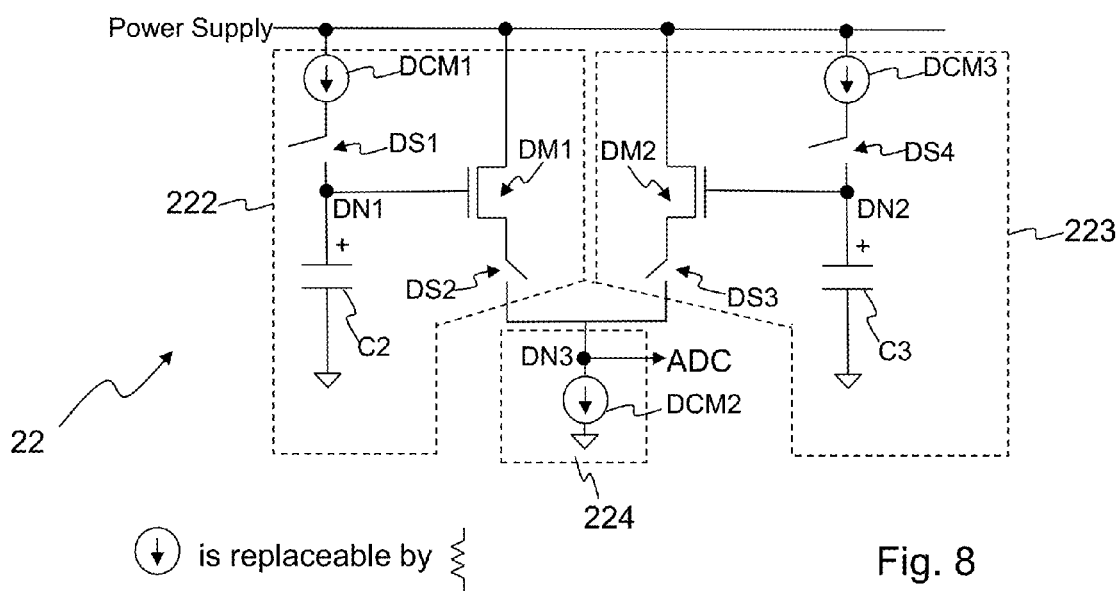
FIG. 8 shows a schematic circuit diagram of a dark node according to an embodiment of the present invention.

Please refer to FIG. 8 in conjugation with FIG. 7. FIG. 8 shows a schematic circuit diagram of the dark node 22 according to an embodiment of the present invention. In a preferred embodiment, the first charge storage unit 222 includes a current source DCM1, a switch DS1, a common node DN1, a capacitor C2, a transistor DM1 and a switch DS2. The current source DCM1, the switch DS1, and the capacitor C2 are connected in series between the power supply and a reference voltage level such as ground. When the switch DS1 is closed, the first power supply information V1 is stored in the capacitor C2. The capacitor C2 has a higher voltage end and a lower voltage end. The higher voltage end of the capacitor C2 is coupled to the common node DN1, and a control end of the transistor DM1 is also coupled to the common node DN1. The transistor DM1 and the switch DS2 is connected in series between the power supply and a common node DN3. The common node DN3 is coupled to the information output unit 224. When the switch DS2 is closed, the information stored in the capacitor C2 is outputted through the common node DN3 to the information output unit 224 by a source-follower effect provided by the transistor DM1.

In a preferred embodiment, the second charge storage unit 223 includes a current source DCM3, a switch DS4, a common node DN2, a capacitor C3, a transistor DM2 and a switch DS3. The current source DCM3, the switch DS4, and the capacitor C3 are connected in series between the power supply and a reference voltage level such as ground. When the switch DS4 is closed, the second power supply information V2 is stored in the capacitor C3. The capacitor C3 has a higher voltage end and a lower voltage end. The higher voltage end of the capacitor C3 is coupled to the common node DN2, and a control end of the transistor DM2 is also coupled to the common node DN2. The transistor DM2 and the switch DS3 is connected in series between the power supply and the common node DN3. When the switch DS3 is closed, the information stored in the capacitor C3 is outputted through the common node DN3 to the information output unit 224 by a source-follower effect provided by the transistor DM2.

In a preferred embodiment, the information output unit 224 includes a current source DCM2 coupled between the common node DN3 and a reference voltage level such as ground. The first sample signal $DN_{Sample1}$ or the second sample signal $DN_{Sample2}$ is outputted from the common node DN3.

The function of the current sources DCM1, DCM2 and DCM3 is to provide a controlled current conduction path. These current sources can be replaced by other components/devices as long as a controlled current conduction path can be formed, such as replaced by resistors. Also please note that the switches DS1-DS4 can be connected at a different location in their respective series connections. For example, the switch DS1 can be connected between the power supply and the current source DCM1, or the switch DS2 can be connected between the power supply and the transistor DM1. Such arrangements of the switches are less preferred but still within the scope of the present invention.

During the reset phase, the switch DS1 is closed, and the first power supply information V1 is stored in the capacitor C2. During the first sample stage of the readout phase, the switch DS2 is closed, and the information stored in the capacitor C2 is outputted through the common node DN3. During the first sample stage of the readout phase, the switch DS2 is closed, and the information stored in the capacitor C2 is outputted through the common node DN3. During the second sample stage of the readout phase, the switch DS4 is closed, and the second power supply information V2 is stored in the capacitor C3; furthermore, the switch DS3 is also closed, so the information stored in the capacitor C3 is outputted through the common node DN3.

The three operation phases of the image pixel 20 will be explained in more detail below.

Figure 9A:
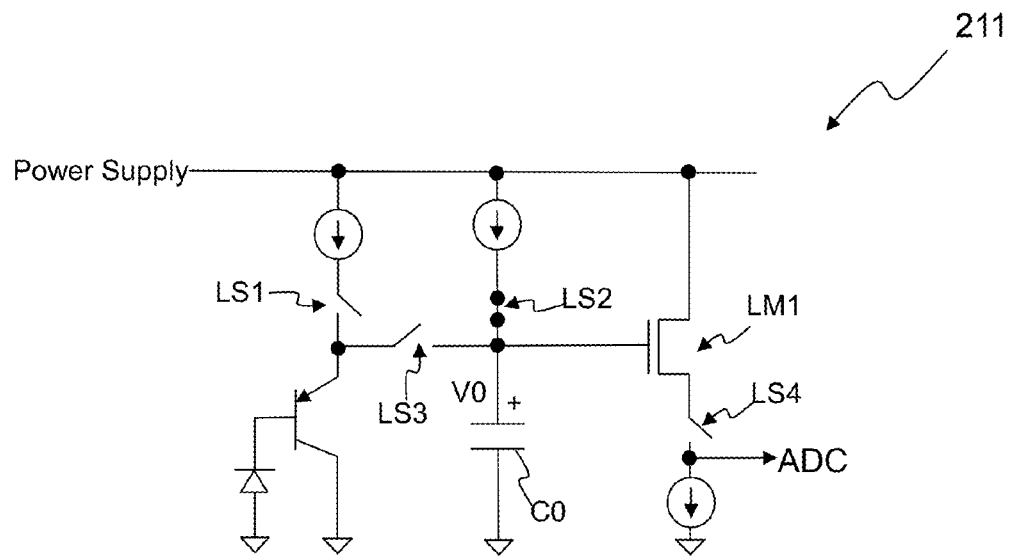
FIG. 9A shows a schematic diagram of a light node during a reset phase according to an embodiment of the present invention.
Figure 9B:
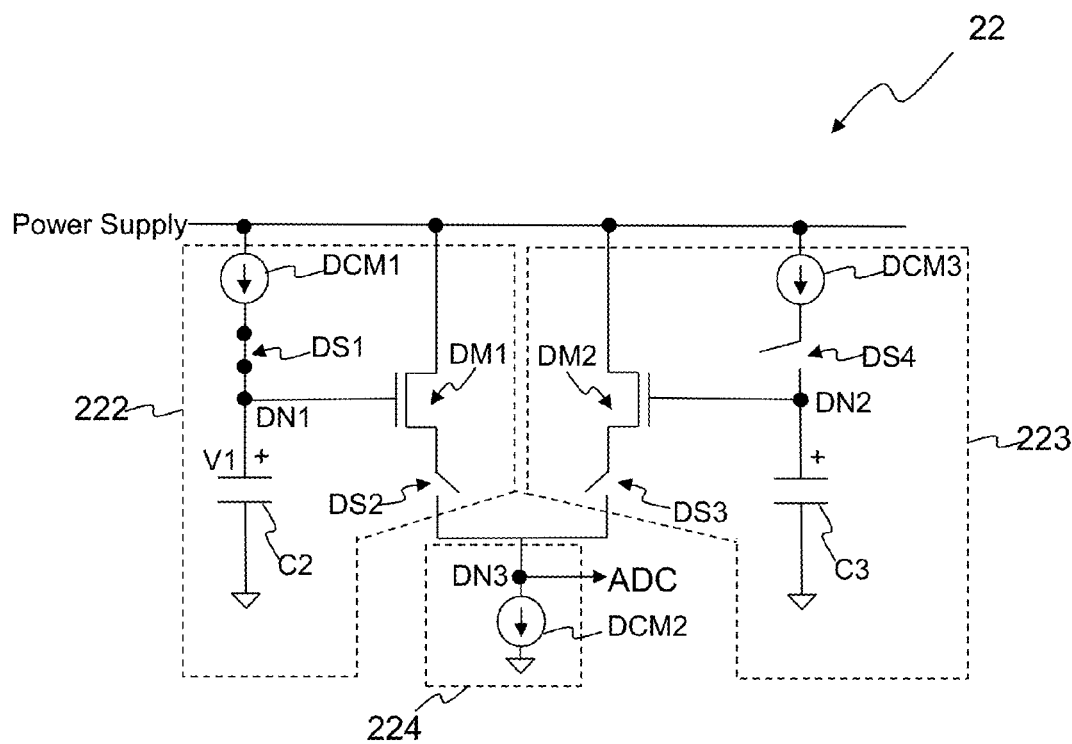
FIG. 9B shows a schematic diagram of a dark node during a reset phase according to an embodiment of the present invention.

Please refer to FIGS. 9A and 9B. FIG. 9A shows a schematic diagram of a light node during a reset phase according to an embodiment of the present invention. FIG. 9B shows a schematic diagram of a dark node during a reset phase according to an embodiment of the present invention. As shown in FIG. 9A, during the reset phase, the capacitor C0 of the light node 211 and the capacitor C2 of the first charge storage unit 222 of the dark node 22 are reset (coupled to the power supply to store information of the power supply). That is, the switches LS2 and DS1 are closed, while the other switches are open. Hence, the power supply information V0 is stored in the capacitor C0 of the light node 211 (as shown in FIG. 9A) and the first power supply information V1 is stored in the capacitor C2 of the dark node 22 (as shown in FIG. 9B); V0=V1.

Figure 10A:
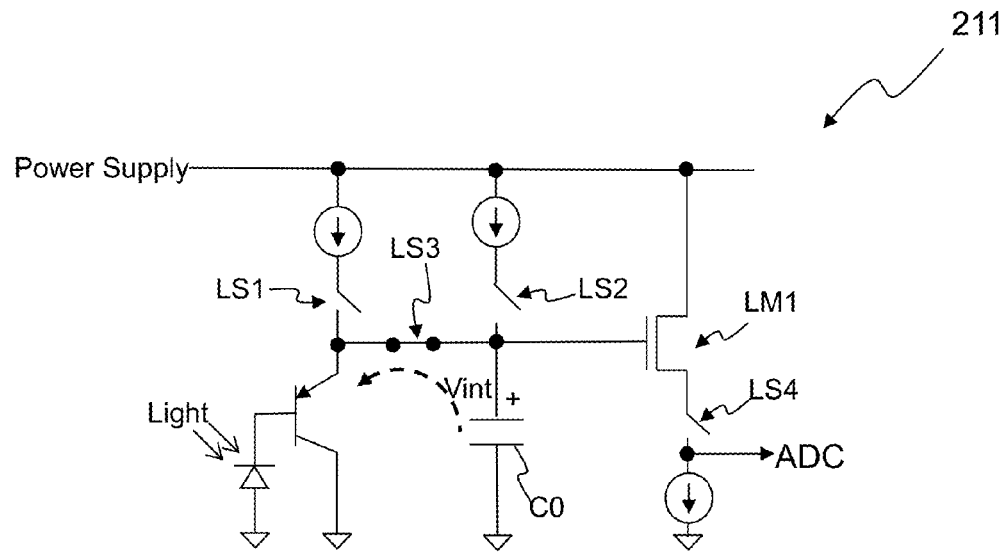
FIG. 10A shows a schematic diagram of a light node during a shutter phase according to an embodiment of the present invention.
Figure 10B:
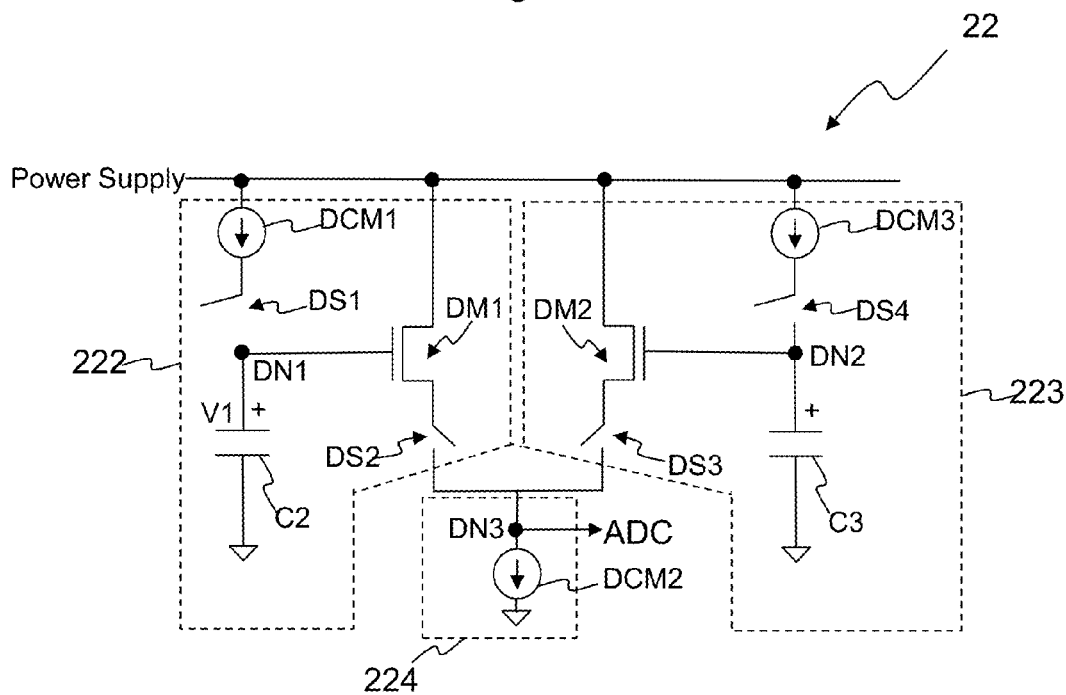
FIG. 10B shows a schematic diagram of a dark node during a shutter phase according to an embodiment of the present invention.

Please refer to FIGS. 10A and 10B. FIG. 10A shows a schematic diagram of a light node during a shutter phase according to an embodiment of the present invention. FIG. 10B shows a schematic diagram of a dark node during a shutter phase according to an embodiment of the present invention. During the shutter phase, the capacitor C0 of the light node 211 performs integration in response to the received light (as indicated in FIG. 10A) to produce an integration voltage Vint, so that the power supply information stored in the capacitor C0 of the light node 211 now becomes "Vint" instead of "V0"; in the meanwhile, the power supply information V1 stored in the capacitor C2 of the first charge storage unit 222 of the dark node 22 remains the same (please refer to FIG. 9B in conjugation with FIG. 10B). That is, during the shutter phase, the capacitor C0 discharges so that the voltage of the capacitor C0 drops lower than the first power supply information V1: Vint<V1. However, the first power supply information V1 is still stored in the capacitor C2 of the dark node 22.

Figure 11A:
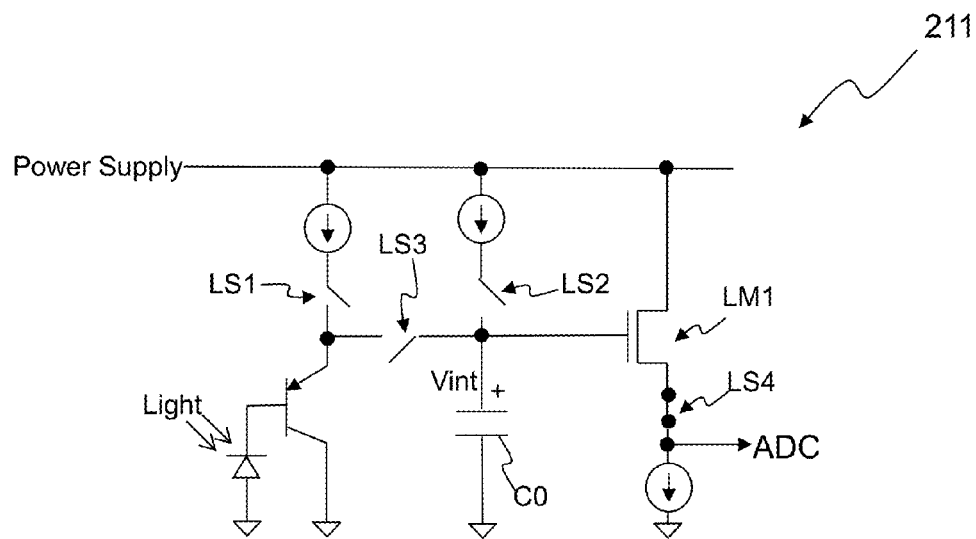
FIG. 11A shows a schematic diagram of a light node during a first sample stage of a readout phase according to an embodiment of the present invention.
Figure 11B:
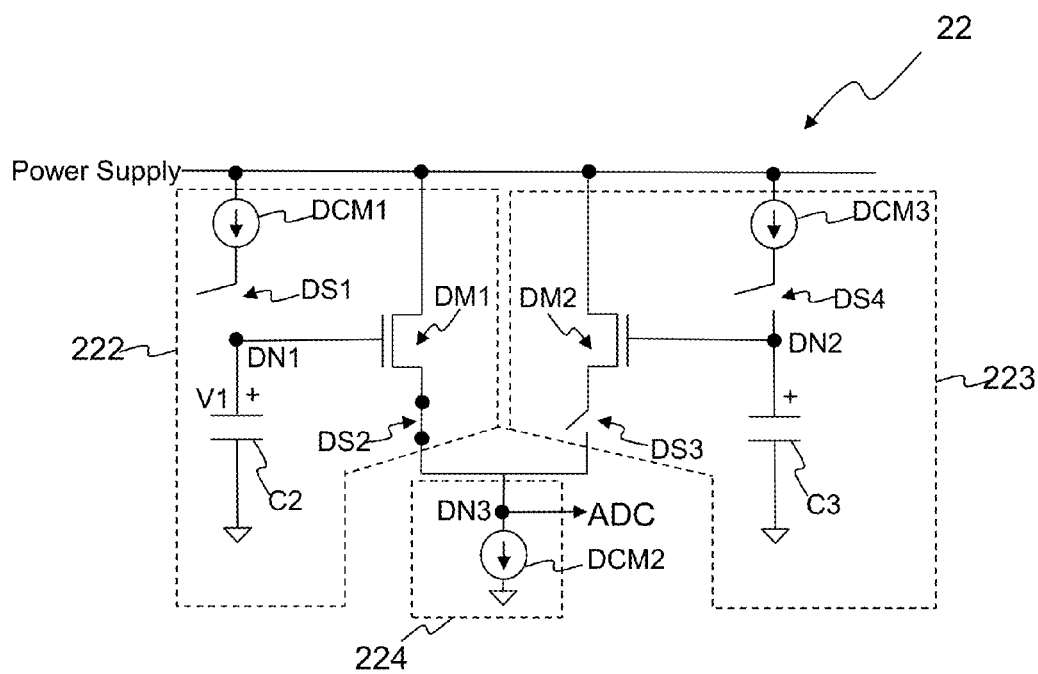
FIG. 11B shows a schematic diagram of a dark node during a first sample stage of a readout phase according to an embodiment of the present invention.

Please refer to FIGS. 11A and 11B. FIG. 11A shows a schematic diagram of a light node during a first sample stage of a readout phase according to an embodiment of the present invention. FIG. 11B shows a schematic diagram of a dark node during a first sample stage of a readout phase according to an embodiment of the present invention. As described above, the first sample stage is for obtaining the differential signal $(DN-LN)_{Sample1}$. In the shutter phase as shown by FIGS. 10A-10B, the capacitor C0 of the light node 211 stores the integration voltage Vint, and the capacitor C2 of the first charge storage unit 222 of the dark node 22 stores the first power supply information V1. Hence, during the first sample stage of the readout phase, the switches LS4 and DS2 are closed, whereby the information Vint and V1 stored in the capacitors C0 and C2 are outputted to an analog-to-digital converter (ADC) to form a differential signal. The ADC receives these two signals through source follower effects provided by transistors LM1 and DM1, where the input of ADC is equal to (V1-Vint) multiplied by the gain of source followers, assuming that the gain of the two source followers LM1 and DM1 are the same.

Figure 12A:
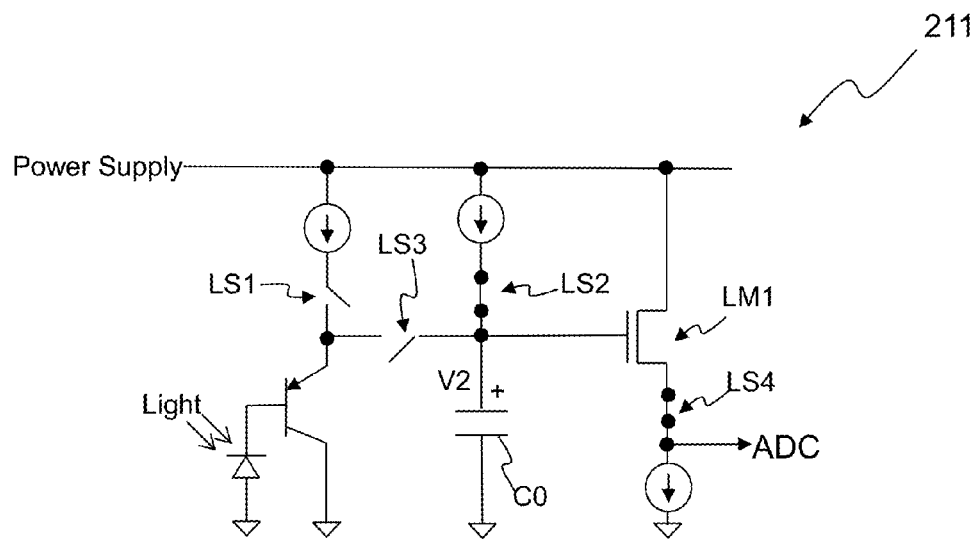
FIG. 12A shows a schematic diagram of a light node during a second sample stage of a readout phase according to an embodiment of the present invention.
Figure 12B:
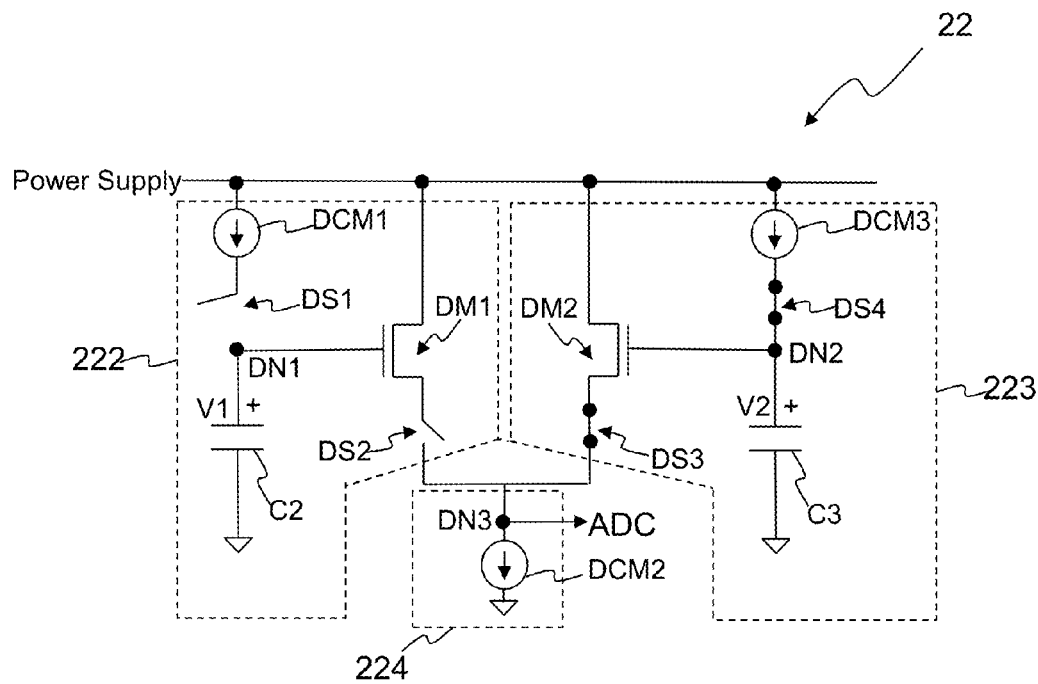
FIG. 12B shows a schematic diagram of a dark node during a second sample stage of a readout phase according to an embodiment of the present invention.

Please refer to FIGS. 12A and 12B. FIG. 12A shows a schematic diagram of a light node during a second sample stage of a readout phase according to an embodiment of the present invention. FIG. 12B shows a schematic diagram of a dark node during a second sample stage of a readout phase according to an embodiment of the present invention. As described above, the second sample stage is for obtaining the second differential signal $(DN-LN)_{Sample2}$. According to the present invention, during the second sample stage, the second charge storage unit 223 is reset simultaneously with the light node 211 (i.e., coupled to the power supply). More specifically, during the second sample stage, the switches LS2, LS4, DS3 and DS4 are closed. Thus, the second power supply information V2 is stored in both the capacitor C0 of the light node 211 and the capacitor C3 of the second charge storage unit 223 of the dark node 22. The second power supply information V2 stored in the capacitor C0 and the second power supply information V2 stored in the capacitor C3 are outputted to the ADC. The ADC receives these two signals through source follower effects provided by transistors LM1 and DM2.

Please note that, importantly, the capacitor C2 of the first charge storage unit 222 of the dark node 22 is not reset during the readout phase, so the first power supply information V1 is not lost. Therefore, the same power supply information V1 can be used by all the light nodes 211. That is, during the first sample stage of the readout phase of the next light node, the input of ADC is still equal to (V1-Vint) multiplied by the gain of source followers. Because the same power supply information V1 is kept, the present invention is not sensitive to power supply noise, and less number of dark nodes are required; for example, in a preferred embodiment, an image pixel only requires one dark node. Assuming that the array 21 shown in FIG. 6 is a 22×22 array, the silicon area can be reduced by about ½₂*100%=4.5% of the total pixel array size, because the dark nodes need not occupy one row or column.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a MOS transistor can be replaced by a BJT transistor or a BJT transistor can be replaced by a MOS transistor. For another example, a component or device which does not affect the primary function of the overall circuit, such as a switch, can be inserted between two components or devices shown to be in direct connection. In view of the foregoing, the spirit of the present invention should cover all such and other modifications and variations, which should be interpreted to fall within the scope of the following claims and their equivalents.

What is claimed is:
1. An image pixel, comprising:
   a plurality of light nodes which are arranged in an array and receive power from a power supply; and
   at least one dark node, wherein the dark node includes:
   a first charge storage unit coupled to the power supply for storing first power supply information related to the power supply during a first time period;

a second charge storage unit coupled to the power supply for storing second power supply information related to the power supply during a second time period; and an information output unit coupled to both the first and second charge storage units for outputting a first sample signal related to the first power supply information or a second sample signal related to the second power supply information;

wherein the first power supply information remains in the first charge storage unit during the second time period and during when the second sample signal is outputted by the information output unit.

2. The image pixel of claim 1, wherein the image pixel operates by three phases including:

a reset phase which includes the first time period, in which the light nodes are reset to store the first power supply information and the first charge storage unit also stores the first power supply information;

a shutter phase, in which the light nodes are exposed to light to produce integrated voltages in response to the light; and a readout phase which is performed sequentially for every light node, the readout phase including a first sample stage and a second sample stage, wherein in the first sample stage, the first power supply information is outputted from the first charge storage unit and the integrated voltage corresponding to a selected one of the light nodes is outputted, and wherein in the second sample stage which includes the second time period, the selected one of the light nodes is reset to store the second power supply information and the second charge storage unit also stores the second power supply information.

3. The image pixel of claim 2, wherein in the second sample stage, the selected one of the light nodes outputs the second power supply information and the second charge storage unit also outputs the second power supply information.

4. The image pixel of claim 2, wherein in the first sample stage, a differential signal is formed which is related to the first power supply information minus the integrated voltage corresponding to the selected one of the light nodes, or Vi-Vint, wherein V1 is the first power supply information and Vint is the integrated voltage corresponding to the selected one of the light nodes.

5. The image pixel of claim 1, wherein the image pixel includes only one dark node.

6. The image pixel of claim 1, wherein the first charge storage unit includes:

a first current conduction device, a first switch, and a first capacitor connected in series between the power supply and a reference voltage level, wherein when the first switch is closed, the first power supply information is stored in the first capacitor; and a first transistor and a second switch connected in series between the power supply and an output common node, the first transistor having a control end coupled to a higher voltage end of the first capacitor, wherein when the second switch is closed, the information stored in the first capacitor is outputted through the output common node; and wherein the second charge storage unit includes:

a second current conduction device, a third switch, and a second capacitor connected in series between the power supply and the reference voltage level, wherein when the third switch is closed, the second power supply information is stored in the second capacitor; and a second transistor and a fourth switch connected in series between the power supply and the output common node, the second transistor having a control end coupled to a higher voltage end of the second capacitor, wherein when the fourth switch is closed, the information stored in the second capacitor is outputted through the output common node.

7. The image pixel of claim 6, wherein the first and second current conduction devices are current sources or resistors.

8. A dark node for use in an image pixel, wherein the dark node includes:

a first current conduction device, a first switch, and a first capacitor connected in series between a power supply and a reference voltage level;

a first transistor and a second switch connected in series between the power supply and an output common node, the first transistor having a control end coupled to a higher voltage end of the first capacitor;

a second current conduction device, a third switch, and a second capacitor connected in series between the power supply and the reference voltage level;

a second transistor and a fourth switch connected in series between the power supply and the output common node, the second transistor having a control end coupled to a higher voltage end of the second capacitor; and a third current conduction device coupled to the output common node.

9. The dark node of claim 8, wherein the first, second and third current conduction devices are current sources or resistors.

10. A method for controlling an image pixel including a plurality of light nodes and at least one dark node, the method comprising:

resetting the light nodes and the dark node to a first voltage level corresponding to a power supply during a first time period, and storing the voltage level by a first storage unit in the dark node;

exposing the light nodes to light;

reading out a selected one of the light nodes and the first voltage level stored by the first storage unit; and resetting the selected one of the light nodes and the dark node to a second voltage level corresponding to the power supply during a second time period, and storing the second voltage level by a second storage unit in the dark node;

wherein the first storage unit keeps the first voltage level when the dark node is reset to a second voltage level.

11. The method of claim 10, further comprising: outputting the second voltage level from the selected one of the light nodes and the dark node.

12. The method of claim 11, further comprising: repeating the reading out step for every light node, and resetting the readout light node and the dark node to the second voltage level.

\* \* \* \* \*